Feb. 19, 1957 W. A. MARRISON 2,782,313

HIGH PRECISION FREQUENCY STANDARDS

Filed July 29, 1953

INVENTOR
W. A. MARRISON
BY Harry C. Hart
ATTORNEY

United States Patent Office 2,782,313

Patented Feb. 19, 1957

2,782,313

HIGH PRECISION FREQUENCY STANDARDS

Warren A. Marrison, Berkeley Heights, N. J., assignor to Bell Telephone Laboratories, Incorporated, New York, N. Y., a corporation of New York Application July 29, 1953, Serial No. 371,064

12 Claims. (Cl. 250—36)

This invention relates to the stabilization of oscillators and has for its object the provision of standards of frequency and of time of the highest possible precision.

Standards of time have for generations been based on astronomical observations, notably the transit of a star across the meridian. Because such an event can never take place more frequently than once in twenty-four hours, a clock or similar mechanism has been required which shall divide this twenty-four hour period into shorter subperiods with all possible accuracy, being checked and, if necessary readjusted as to its rate, against successive observations of star transits. For time measurements of seconds, minutes and hours, mechanical clocks have been developed whose errors are very low, e. g., of the order of one part in ten million or better.

Over the past decade or so, it has been necessary to measure time intervals as short as a microsecond or less with all possible accuracy and for this purpose the crystal-controlled clock has been to date the most reliable instrument. Essentially, the crystal-controlled clock comprises a crystal-tuned oscillator whose oscillation frequency is in the kilocycle or megacycle range, followed by a frequency divider which steps down the oscillator frequency, usually by a number of successive steps, to a range appropriate for the operation of a motor-driven clock of conventional scale. Over a period of the order of seconds, the crystal-controlled oscillator has excellent so-called "short-term" stability of frequency. Due, however, to temperature effects, ageing of the crystal and the like, its long-term stability and its stability over a period of twenty-four hours or so is much less good. Consequently, the time intervals which it measures during the early part of a day may differ somewhat in length from those which it measures during a later part of the same day, though all of them are nominally exactly alike in magnitude.

Within the past few years, the selective absorption by certain gases of electromagnetic microwaves of certain high frequencies was discovered and this phenomenon furnishes the basis for an improved standard of high frequencies and short times. An oscillator of any appropriate construction may be tuned approximately to the absorption frequency of the gas and a servo system, responsive to variations in the absorption by the gas of the oscillator output energy, acts to restore the oscillator frequency to that of the peak of the absorption curve.

An even more important reason for stabilizing a clock by the selective absorption of microwave energy by gases, or other phenomena depending upon energy transition in molecules or atomic nuclei, is that the frequencies of such phenomena are entirely independent of the dynamics of the solar system, and provide much better primary standards of frequency and time intervals than does the rotation of the earth.

Because the rotation of the earth is known to have a slowly decreasing rate, and variations in rate sometimes amounting to as much as one part in 30 million, the substitution of a primary control phenomenon having no comparable variations would be of considerable value in numerous applications.

The present invention relates to means for utilizing such phenomena for the control of oscillators and mechanisms such as may be used for all purposes requiring the greatest possible accuracy.

As in the case of other frequency selective systems, the sloping shoulders of the gas absorption curve are its most sensitive portions. In an endeavor to turn them to account, it has already been proposed to modulate the oscillator frequency $f$ to provide two other frequencies $f+\Delta f$ and $f-\Delta f$ which fall on the upper and lower shoulders, respectively. Either amplitude modulation may be employed to generate these upper and lower side frequencies continuously, or, if preferred, frequency modulation techniques may be resorted to which generate these upper and lower side frequencies in alternation. While sound in principle, these proposals fall short of perfection in practice because of the unfortunate but unavoidable fact that the modulation process produces a large number of different frequency components, only one of which is wanted. The unwanted ones must be suppressed by the use of filters. The wider the spread between the two frequencies which are to be modulated together, the less is the separation on the frequency scale of the resulting modulation products. When dealing with the selective absorption curve of a gas which is exceedingly sharp and narrow, the modulating frequency $\Delta f$, which is equal to only one half the width of the absorption curve, is very low indeed as compared with the frequency $f$ which is equal to that of the peak of the curve. Consequently, when the highest precision is sought by employing the gas resonance curve as the ultimate frequency standard, the greatest difficulty is encountered in segregating those modulation products which are desired for application to the gas absorption curve from the undesired ones. Application of undesired modulation products to the gas absorption curve in substantial quantities would of course completely vitiate the results.

Systems of the kind here referred to are described in a publication entitled "Spectral Lines as Frequency Standards" by Harold Lyons, National Bureau of Standards Report No. 1848.

The present invention stems from the realization that there is no real necessity that the oscillator to be stabilized shall be so stabilized at the frequency of the peak of the absorption curve of the gas or other frequency selective element employed as a standard, or at any specified submultiple thereof. Rather, it is only necessary that some specified function of the oscillator frequency be so stabilized. Proceeding along lines suggested by this realization, the invention employs not one oscillator but two. They are adjusted in preliminary fashion to operate at approximately the frequencies of the upper and lower shoulders of the resonance curve of the standard element, e. g., at the upper and lower shoulders of the microwave absorption curve of a gas or at specified submultiples thereof. With a sharp, narrow resonance curve, these two oscillator frequencies lie close together on the frequency scale, i. e., their ratio is very close to unity. By the same token, when their outputs are modulated together, the resulting modulation products are spaced well apart on the frequency scale. Indeed, it is easily possible, if desired, to arrange that no one such modulation product be any closer to its nearest neighbor than 50 percent. Ordinary filter apparatus then suffices easily to remove all undesired modulation products, retaining only the desired one.

At the same time, the outputs of the individual oscillators are applied in alternation to the frequency selective element which responds in greater or less degree according as the oscillator frequency is above or below its nominal value. This alternating application may be carried out by a simple low frequency switch or commutator. The output from the resonant element, after rectification, then consists of a control wave which alternates at the low commutation frequency and whose amplitude throughout one half cycle is a measure of the departure of one of the oscillators from its correct nominal frequency, its amplitude throughout the following half cycle being similarly a measure of the departure of the other oscillator from its correct frequency. A servo system which may be of any desired variety is now actuated by this alternating signal and it in turn acts to retune both of the oscillators together to such frequencies that the alternating component of this control wave is zero. Under this condition the oscillator frequencies, or specified multiples thereof, are spaced above and below the peak frequency of the resonance curve by the same amount, and very exactly so; i. e., the average of these oscillator frequencies is a very exact submultiple of the peak frequency of the absorption curve. The average of these two frequencies is evidently equal to one half their sum, so that this sum, too, is stabilized with all possible precision. Inasmuch as this sum is one of the easily segregated products of modulation, it may serve as a highly accurate standard of frequency and time, being employed after appropriate frequency division operations to drive a master clock.

As stated above, the individual oscillators are tuned approximately to the frequencies of the upper and lower shoulders of the absorption curve and, after stabilization, are tuned to frequencies which are equally spaced above and below the absorption curve peak frequency. For optimum sensitivity of the control mechanism, it is preferable that these frequencies be located at the points of greatest slope of the absorption curve. That is to say, while the sum of the oscillator frequencies has been stabilized at the peak of the absorption curve, it is also desirable that their frequency difference be stabilized at the points of maximum slope of the curve. These points are normally the points at which the amplitude of the curve, measured from its base line, is one half its peak amplitude. The invention provides simple and reliable means for so stabilizing the oscillator frequency difference.

As a further refinement an automatic volume control system is included which acts to hold the operation of the individual oscillators at the same energy level. This serves to prevent extraneeous effects which might otherwise be introduced by the successive application to the resonant element of energy of one magnitude and a first frequency on one half cycle of the commutator and then, on the next half cycle, energy of another frequency and of a magnitude which may differ by an unknown amount.

While the invention is applicable to the stabilization of oscillators against any frequency standard whatsoever, provided its behaviour may be represented by an energy response curve having a maximum or a minimum between two sloping portions, it will be described in connection with an illustrative embodiment in which the selective element is in fact a microwave gas absorption cell. This description is to be read in connection with the accompanying drawings in which.

Figures 1, 2, 3:
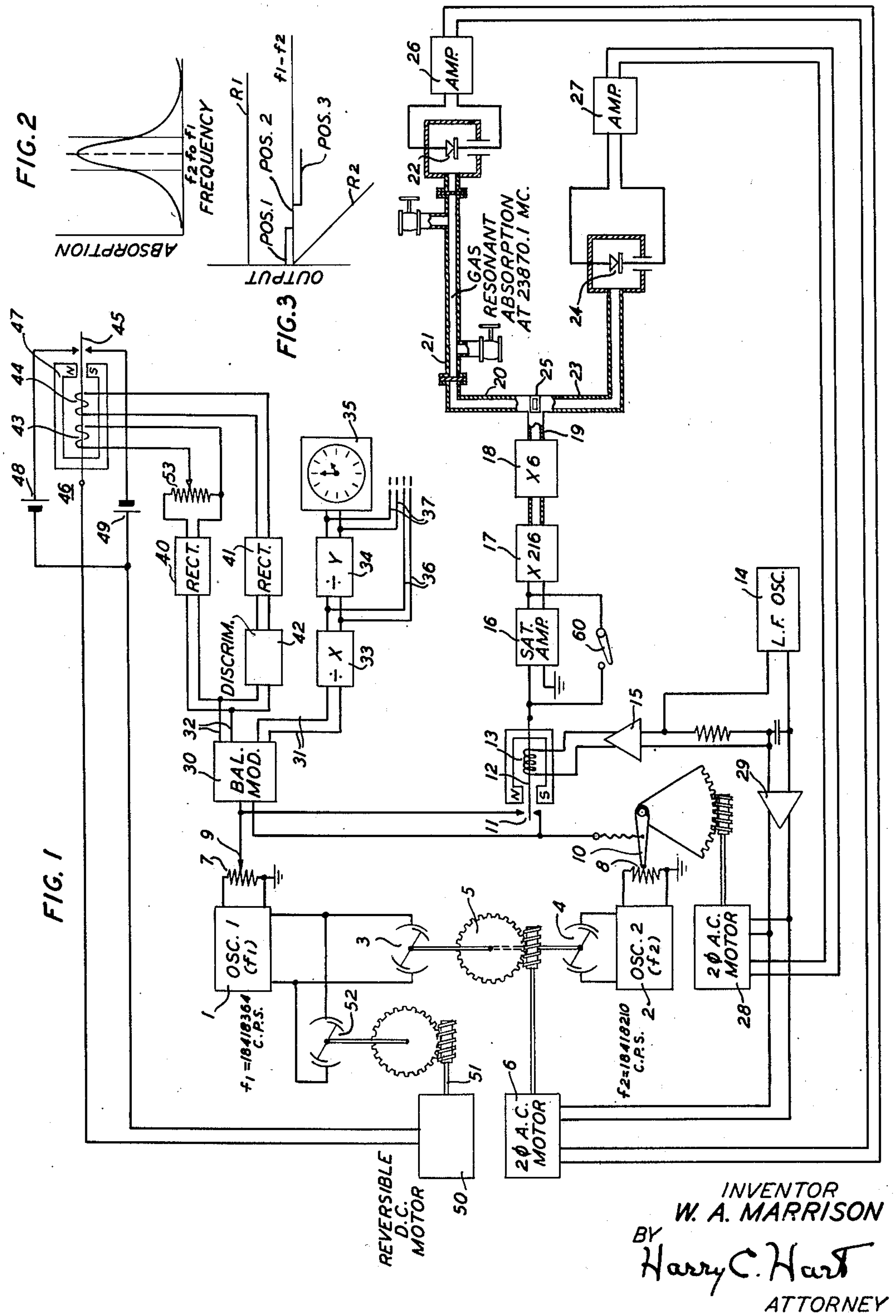
Fig. 1 is a schematic circuit diagram of apparatus embodying the invention.
Fig. 2 shows the microwave absorption frequency characteristic of a gas.
Fig. 3 is an explanatory graph.

Referring now to the drawings, Fig. 1 shows two independent oscillators, 1 and 2, their adjustments being such that their frequencies of oscillation $f_1$ and $f_2$ are almost but not quite alike. Specifically, the frequency of the lower oscillator may be 18,418,210 cycles per second and that of the upper oscillator may be 18,418,364 cycles per second. These figures may otherwise be expressed as 18,418,287−77 and 18,418,287+77. To take full advantage of the accuracy provided by the invention, it is preferred that the individual oscillators be of the most stable variety obtainable. In the frequency range here used for illustration, the crystal oscillator has come to be recognized as the best from many standpoints, including short-time frequency stability. A suitable oscillator circuit which is simple and has been found to be both rugged and reliable is shown in the Bell Laboratories Record for June 1953, at page 205.

Each of these oscillators 1, 2 is provided with a tuning condenser 3, 4, variation of which alters its oscillation frequency over a narrow range. As is now well known, such a trimming condenser may be connected in shunt with the frequency-controlling crystal. These two tuning condensers may be mounted on a shaft 5 which is turned by a gear which in turn is driven by a worm mounted on the shaft of a servo motor 6. Operation of this motor under control of signals to be described then rotates these two condensers 3, 4 in the same angular direction, i. e., in a direction either to increase the frequencies of both oscillators or to decrease them both.

The outputs of the individual oscillators appear across adjustable resistors 7, 8, the wiper arms 9, 10 of which are individually connected to the upper and lower contacts of a 2-position switch 11. The armature 12 of this switch is alternately connected to the upper contact and to the lower one by application of a current to a control winding 13 which links an armature 12. This current is preferably of a low frequency, such as 60 cycles per second. It is derived from a low frequency oscillator 14 which supplies its output energy to a conventional phase divider circuit which may comprise a resistor and a condenser in series. With this arrangement, the voltage across the resistor leads the voltage of the oscillator 14 by 45 degrees, while the voltage across the condenser lags it by 45 degrees so that the voltage across the resistor leads that across the condenser by 90 degrees. The former voltage is applied to the input terminals of an amplifier 15 and the output of this amplifier in turn supplies the control winding 13 which actuates the armature 12 of the switch 11. This armature 12 constitutes the common terminal of the switch 11 and it is connected through a constant output amplifier 16, e. g., a "saturated" amplifier, to cascaded frequency multipliers 17, 18 whose output terminals are connected by way of wave guide piping to the first branch 19 of a 4-branch wave guide hybrid junction. This element is shown and described in "Principles and Applications of Wave Guide Transmission" by G. C. Southworth (Van Nostrand 1950) at page 341. Of this element, the second branch 20 is connected by way of a gas-filled guide section 21 to a rectifier 22, while the lower branch 23 is connected directly to another rectifier 24, and the fourth branch 25, indicated in section, is terminated with an impedance of appropriate magnitude in well-known fashion, the rectifier outputs being applied respectively to individual alternating current amplifiers 26, 27. Disregarding for the time being the lower path, the output of the amplifier 26 in the upper wave guide path is applied to two of the four terminals of a 2-phase alternating current motor 6. To its other two terminals there is connected the output of the low frequency oscillator 14 by way of the phase shifter and an amplifier 29.

The multiplication operation carried out by the multipliers 17, 18 is such as to increase the frequencies $f_1$ and $f_2$ of the two oscillators 1, 2 by the same factor N, namely a factor such that the resulting products, $f_1'$ and $f_2'$, are approximately equal to the frequencies of the most steeply sloping portions of the upper and lower shoulders, respectively, of the gas absorption curve. A suitable factor which accomplishes this for the oscillator frequencies of the present illustrative embodiment is 1296. Thus, in this example, $f_1'=1296f_1$ and $f_2'=1296f_2$. The same factor N operates to locate the mean ½$(f_1'+f_2')$ of the two multiplied oscillator frequencies $f_1'$ and $f_2'$ approximately at the frequency $f_0$ of the peak of the gas absorption curve, namely 23870.1 megacycles per second; and, provided the individual oscillators have been retuned in the fashion to be described, precisely so.

The multiplication operation may be carried out in any desired fashion, it being preferred in accordance with principles which are well understood, to do so in several steps. Thus, in the example shown, the operation is carried out by two multipliers 17, 18 connected in tandem, of which the first introduces a factor 216 and the second further multiplies the result by 6. When the multiplication is carried out in this fashion, no two modulation products, which always exist in the output of a multiplier, are spaced apart on the frequency scale by less than 16.5 percent. With such a wide spacing, the application of adjacent modulation products to the narrow absorption band of the gas cell introduces no problems. The factor 216 is equal to 2×2×2×3×3×3, and accordingly, by the same token, the multiplier 17 may itself comprise three frequency doublers and three frequency triplers, all connected in cascade. This prevents application to any component multiplier of closely spaced modulation products derived from its predecessor.

Construction of the individual component multipliers may follow well-known principles of design. Such elements are discussed, for example, for low and medium frequencies in Terman's "Radio Engineers' Handbook" (McGraw-Hill, 1943) at pages 458 and 459 and for microwave frequencies in an article published in the Bell System Technical Journal for October 1951, vol. 30, part 2, page 1041.

Consider now the operation with the premise that the armature 12 of the switch 11 is engaging its upper contact. The output of the upper oscillator 1 is applied by way of the frequency multipliers 17, 18 to the gas cell 21 whose absorption-frequency characteristic is shown in Fig. 2. As explained above, the frequency $f_1'$ is approximately that of the point of half amplitude and the greatest slope of the absorption curve of the gas above its peak absorption frequency. Energy of this frequency $f_1'$ then enters the gas cell 21, and energy comes through the gas and reaches the detector 22 which is directly proportional to the input energy and varies inversely with the amount of the energy which has been absorbed by the gas. Over the half cycle of the low frequency of the oscillator 14 during which the armature 12 is in its upper position, many thousands of these oscillations take place. During this period, therefore, the detector 22 can be regarded as producing direct current of steady value and of magnitude proportional to the microwave energy which passes through the gas. This energy is rectified by the detector 22 and applied to the amplifier 26.

During the ensuing half cycle of the low frequency oscillator 14 when the armature 12 of the switch 11 engages its lower contact, the energy of the lower oscillator 2 is similarly applied through the multipliers 17, 18 and to the gas absorption cell 21. The energy transmitted through the gas now corresponds with the amplitude of the gas absorption curve on its lower shoulder. This energy is rectified by the detector 22 and applied to the amplifier 26.

Regarding the situation now from a less microscopic standpoint, and over a period of a second or so, the armature 12 of the switch 11 adopts first its upper position and then its lower position and so on, so that the energy applied from the detector 22 to the amplifier 26 appears to have a succession of values, odd members of which succession are related to the absorption by the gas of the output of the lower oscillator 2 at some point of the lower shoulder of the curve while even members are similarly related to the absorption by the gas of the output of the upper oscillator 1 at some point of its upper shoulder. In other words, the signal applied to the amplifier 26 contains an alternating component whose fundamental frequency is that of the low frequency oscillator 14, e. g., 60 cycles per second, and whose amplitude is precisely and very sensitively related to the departures of the frequencies of the respective oscillators 1, 2 from their correct symmetrical disposition on either side of the gas absorption curve peak frequency.

The alternating component is applied directly to two terminals of the 2-phase motor 6. For low frequency purposes, it is substantially in phase with the energy applied to the switch 11. As shown above, the latter is derived by way of a phase shifter from the low frequency oscillator 14. To the other two terminals of the motor 6 is applied energy of the same low frequency oscillator 14, but displaced in phase by 90 degrees from the first input. Thus, the two motor inputs differ in phase by 90 degrees which is the customary requirement for operation of such a motor. This causes operation of the motor 6 which rotates both of the oscillator tuning condensers 3, 4 in the same direction. In accordance with the well known principles of servo system design, this direction is such as to reduce the magnitude of the alternating component of the input to the amplifier 26 and so effectively to readjust the oscillator frequencies $f_1$, $f_2$ until they are symmetrically spaced about the gas absorption curve peak frequency $f_0$.

The individual oscillator frequencies being now adjusted precisely to the same submultiple, namely, 1/1296 of two frequencies which are symmetrically disposed on either side of the peak frequency of the gas absorption curve, it follows that their sum is with very great precision equal to 1/648 of the gas absorption curve peak frequency.

Thus, in the example given, the sum of the two oscillator frequencies is 36.836574 megacycles per second. This figure multiplied by 648 is equal to 23870.1 megacycles per second which is the approximate value of the frequency of the peak of the principal microwave absorption line of ammonia gas.

The precision of control attainable by this method is such that, by measuring the frequency of the sum of the two oscillators in terms of astronomical time, the frequency of the absorption characteristic can be determined as accurately as astronomical time can be specified. Indeed, it is expected that by this means the variations in astronomical time, as defined by the rotation of the earth, can be determined by comparison with the absorption characteristics which is believed to be a much more stable standard.

With the apparatus above described when it operates in the foregoing fashion, the energy output of the last multiplier of the chain, which in the present illustrative example is the multiplier 18, constitutes a source of oscillations for applications to the gas cell which during one part of the operating cycle are of the frequency $f_1'$ and during the remaining part of the operating cycle are of the frequency $f_2'$. Thus, in effect, the gas cell receives the energies of two different oscillation sources in alternation and these two effective sources are so adjusted that their frequencies, $f_1'$ and $f_2'$, respectively, lie on the upper and lower sloping portions of the energy frequency response curve of the gas cell.

It is clearly not essential in the practice of the invention that multipliers be included in the system or employed in the practice of the invention. In the present illustrative embodiment they serve to permit the employment of individual oscillators 1 and 2 whose output frequencies lie in a part of the frequency range such that they are easily constructed in accordance with well known techniques and including well known components and have a high degree of first-order stability. By the same token, these multipliers enable the use in the present illustrative embodiment of a selective element of the highest stability obtainable but which, nevertheless, carries out its frequency selection in a part of the range which is widely separated from the frequency range of the oscillators. In particular, the peak of the response curve of the gas cell lies at a frequency which is between 1000 and 2000 times the frequency of either of the oscillators 1, 2. The multipliers thus serve in effect to translate the oscillator frequencies from the range in which the oscillators are easily constructed to the range in which the selective element chosen for stabilization, whatever it may be, exhibits its most useful selective properties.

Since the individual oscillator frequencies may shift, over a period of minutes or hours, by amounts which are considerable in the light of the precision here to be attained, the possibility arises that one of them may shift upward or downward relatively to the other so that their difference increases or decreases, their sum remaining the same by virtue of the foregoing stabilization action. When this occurs, the points on the gas absorption curve at which the individual multiplied oscillator frequencies $f_1'$ and $f_2'$ are located may rise and fall on the resonance curve, the sum of the frequencies being stabilized at a level of high absorption when the frequency difference is reduced and at a level of low absorption when the frequency difference is increased. While this result does not in principle affect the foregoing sum stabilization, it nevertheless reduces the sensitivity of the control system by removing the oscillator frequencies from those values at which the slopes of the shoulders of the gas absorption curve are greatest. Therefore, as a refinement, the invention provides stabilization of the oscillator frequency difference $f_1-f_2$ in the fashion now to be described.

The wiper arms 9, 10 of the potentiometers 7, 8 which are connected to the individual output terminals of the oscillators 1, 2 are connected to the two input terminals of a balanced modulator 30. The latter is a well known circuit element or combination of circuit elements which operates to furnish at one pair 31 of output terminals a first modulation product whose frequency is equal to the sum $f_1+f_2$ of its input frequencies $f_1$ and $f_2$ and at a second pair 32 of output terminals another modulation product whose frequency is equal to their difference, $f_1-f_2$. The first output is the sum which has been stabilized in the fashion described above. This may be utilized in known fashion to provide standards of frequency and time. Thus, it is applied first to frequency dividers 33, 34 which may be conventional, suitable examples being described, for example, in Terman's "Radio Engineers' Handbook," (McGraw-Hill 1943) page 511. The frequency division may well comprise a number of sequential steps, carried out individually by the dividers 33, 34, terminating in a low frequency suitable for application to a clock 35. Standard frequencies lying in various parts of the frequency range may be derived at output terminals connected at any point of this tandem sequence, two such, 36, 37, being illustrated.

The second pair 32 of output terminals of the balanced modulator 30 are connected to two rectifiers 40, 41 in parallel, a frequency discriminator 42 being interposed in series with one of these rectifiers 41. The rectifier outputs are applied individually to coils 43, 44 which are wound about the armature 45 of a polar relay 46 comprising a permanent magnet 47 and having two external contacts. Inasmuch as the individual oscillator frequencies are very close together, their difference is a comparatively small number, e. g., less than 100 cycles per second. Therefore, low frequency circuits and circuit elements, including the rectifiers 40, 41 and the discriminator 42, suffice for this portion of the system. A bias of one polarity furnished, e. g., by a battery 48, is connected in series with the upper contact while a bias of opposite polarity furnished by another battery 49 is connected in series with the lower contact. These contacts are connected by way of their respective bias batteries to one terminal of a reversible direct current motor 50, while the armature 45 of the relay 46 is connected to the other motor terminal.

With these connections the forces on the armature 45 are balanced under two different conditions: first, when for any reason the balanced modulator 30 gives no output; and second, when it gives an output of a frequency such that the output of the discriminator 42 applied to the lower rectifier 41 is exactly equal to the input to the discriminator 42 as applied to the upper rectifier 40. These conditions are illustrated in Fig. 3 wherein the horizontal curve labeled "$R_1$" represents the output of the upper rectifier 40 and the sloping curve labeled "$R_2$" represents the output of the lower rectifier 41 as influenced by the discriminator 42. When the amplitudes of these two curves are equal and opposite, the forces on the armature 45 of the relay 46 are balanced, and the armature 45 lies in its center position so that the motor 50 remains at rest. Increase or reduction of the frequency difference $f_1-f_2$ results in an increase or reduction of the output of the lower rectifier 41 without affecting that of the upper rectifier 40. Except for a small central marginal region represented in Fig. 3 as position 2 of zero displacement, this frequency departure results in throwing the armature 45 either to its upper contact (position 1) causing the motor 50 to rotate in one direction, or to its lower contact (position 3) causing the motor 50 to rotate in the opposite direction. The motor shaft 51 drives a worm which is coupled to a gear which in turn drives a trimming condenser 52 which introduces a small correction into the frequency of one of the oscillators, here shown as the upper oscillator 1. Following known servo system techniques, this correction is in such a direction as to reduce the difference in the outputs $R_1$ and $R_2$ of Fig. 3 of the two rectifiers 40, 41, whereupon the relay armature 45 moves to its central position and the motor 50 comes to rest.

Those oscillator frequencies are preferred which fall at the steepest parts of the shoulders of the gas absorption curve. By virtue of the fact that the frequency sum, $f_1+f_2$, has already been stabilized in the fashion described above, this result is immediately secured by the automatic adjustment of the frequency difference, $f_1-f_2$, to a value such that the multiplied frequency difference, $f_1'-f_2'$, is precisely equal to the width of the resonance curve at its amplitude of steepest slope. This adjustment may be made in any of a wide number of ways, for example, merely by changing the setting of a potentiometer 53 connected to the output of the upper rectifier 40.

By following the foregoing teachings, it is easily possible to construct crystal-controlled oscillators whose frequencies are of the order of 18 megacycles per second and whose frequency difference is of the order of 100 to 200 cycles per second and in turn to hold this frequency difference constant to within 1 or 2 cycles per second, at least over a period of a few hours. It is by no means as easy to hold the amplitudes of oscillation to such close tolerances, and attempts to do so generally result in disturbances and perturbations in the frequency of oscillation. While the system described above is in principle relatively insensitive to the amplitudes of the outputs of the respective crystal oscillators 1, 2, nevertheless in practice a wide difference in their output amplitudes may affect the correctness of operation of the frequency multipliers 17, 18 and so produce a spurious output from the detector 22 and thus a spurious restoring signal to the tuning servomotor 6. Therefore, it is desirable to provide means for holding the amplitudes of the outputs of the oscillators 1, 2 constant, at least as they are applied to the frequency multipliers 17, 18. A simple way of accomplishing this to a degree satisfactory for most purposes is merely to include in series with the oscillator outputs and the frequency multipliers 17, 18 a constant output amplifier 16, that is to say, an amplifier which responds to the input to it from the upper oscillator 1 or the lower one 2, as the case may be, with an output signal of amplitude independent of the input amplitude. Another more sensitive approach is to provide an amplitude control servo system, i. e., a system which has come in the voice-frequency system art to be known as an automatic volume control system. To this end, the output of the last frequency multiplier 18 of the chain may be applied by way of the third branch 23 of the hybrid junction to the rectifier 24, there being no frequency-selective element in this path. The output of this rectifier 24 is applied to an alternating current amplifier 27 which thus receives a signal which shifts at the rate of the low frequency oscillator 14 from a value related to the amplitude of the output of the $f_1$ oscillator 1 to a value related to the amplitude of the output of the $f_2$ oscillator 2. When this servo system is employed, the saturated amplifier 16 serves no purpose and may be dispensed with or be removed from the circuit, as by closing a switch 60, when the servo system is in use. The output of the amplifier 27 is applied to two of the four terminals of a 2-phase motor 28. This signal is in phase with the low frequency signal as applied to the switch 11. Another signal, which lags the former signal by 90 degrees, is applied by way of the amplifier 29 to the two remaining terminals of the 2-phase motor 28. Thus, the motor is caused to rotate in one direction or the other in dependence on which of the two oscillators 1, 2 provides the greater output. Rotation of the motor operates a worm which meshes with a gear to whose shaft a wiper 10 may be coupled which engages a potentiometer 8 connected to the output terminals of the oscillator 2. In accordance with known servo system techniques, the electrical connections, the slopes of the gear teeth, etc., are coordinated in such a fashion that rotation of the servo motor 28 in whatever direction is called for by the signal applied to it acts to restore equality as between the outputs of the two oscillators 1, 2.

Various changes in the circuit details, including the servo systems, will occur to those skilled in the art. The invention, with or without such variations, is applicable to the stabilization of oscillators against any element characterized by an energy maximum or minimum with sloping portions on either side of it, whether or not this element be a gas.

What is claimed is:

1. A system for supplying energy of standard frequency which comprises a selective element characterized by an energy-frequency response curve having a peak at a specified frequency $f_0$ and, on either side of said peak, a sloping portion, two independent tunable oscillation sources, means for adjusting the frequency of one of said sources approximately to that of a point on one of said sloping portions, means for adjusting the frequency of the other of said sources approximately to that of a point on the other of said sloping portions, means for applying the energies of said sources individually to said selective element, means for deriving from said selective element two independent output signals each of which is representative of the degree to which said selective element modifies the energy of one of said sources, and means responsive to said output signals for tuning both of said sources in the same sense to equalize the magnitudes of said output signals, thereby holding the sum frequency of said two sources equal to $2f_0$, and means for simultaneously holding the difference frequency of said two sources to a fixed value equal to the width of said response curve.

2. Apparatus as defined in claim 1 wherein the points of the sloping portions of the response curve of the selective element to which said source frequencies are adjusted are points of maximum slope.

3. Apparatus as defined in claim 1 wherein the peak of said response curve represents a minimum of transmission of energy through said element.

4. Apparatus as defined in claim 1 wherein said element is a gas characterized by resonant absorption of microwave energy.

5. A system for supplying energy of standard frequency which comprises a selective element characterized by an energy-frequency response curve having a peak at a specified frequency $f_0$ and, on either side of said peak, a sloping portion, two independent tunable oscillation sources, means for adjusting the frequency of one of said sources approximately to that of a point on one of said sloping portions, means for adjusting the frequency of the other of said sources approximately to that of a point on the other of said sloping portions, means for applying the energies of said sources individually to said selective element in alternation, means for deriving from said selective element an output signal having an alternating component, oppositely directed excursions of said alternating component being respectively representative of the energies of said sources as modified by said selective element, and means responsive to said alternating component for tuning both of said sources in the same sense to minimize the amplitude of said alternating component, thereby holding the sum frequency of said two sources at the value $2f_0$.

6. A system for supplying energy of standard frequency which comprises a selective element characterized by an energy-frequency response curve having a peak at a specified frequency $f_0$ and, on either side of said peak, a sloping portion, two independent tunable oscillation sources, means for adjusting the frequency of one of said sources approximately to that of a point on one of said sloping portions, means for adjusting the frequency of the other of said sources approximately to that of a point on the other of said sloping portions, means for applying the energies of said sources individually to said selective element, means for deriving individual output signals from said selective element, means for deriving the difference of said output signals, means for utilizing said difference to retune both of said sources in the same sense to maintain the sum of their frequencies at the value $2f_0$, means for deriving an oscillation source difference signal frequency, and means responsive to said frequency difference signal for tuning at least one of said sources in a sense to reduce said frequency difference signal to a preassigned value.

7. A system for supplying energy of standard frequency which comprises a selective element characterized by an energy-frequency response curve having a peak at a specified frequency $f_0$ and, on either side of said peak, a sloping portion, two independent tunable oscillation sources, means for adjusting the frequency of one of said sources approximately to that of a point on one of said sloping portions, means for adjusting the frequency of the other of said sources approximately to that of a point on the other of said sloping portions, means for applying the energies of said sources individually to said selective element, means for deriving individual output signals from said selective element, means responsive to said output signals for tuning both of said sources in the same sense to minimize the difference between the magnitudes of said output signals, whereby the sum of said two source frequencies is precisely adjusted to $2f_0$, means for deriving a source frequency difference signal, and means for retuning at least one of said sources to maintain said difference signal at a preassigned value, whereby said sources oscillate respectively at frequencies which are symmetrically disposed on the upper and lower sloping portions of said response curve.

8. In combination with apparatus as defined in claim 7, means for modulating the outputs of said two source frequencies together to provide energy of an upper side frequency which is equal to the sum of the frequencies of said two sources, and means for utilizing said energy.

9. In combination with apparatus as defined in claim 7, means for modulating the outputs of said two sources together to provide an upper side frequency equal to their sum and a lower side frequency equal to their difference, means responsive to departures of said lower side frequency from a preassigned value for stabilizing said lower side frequency at said preassigned value, utilization means, and means for supplying energy of said upper side frequency to said utilization means.

10. In combination with apparatus as defined in claim 7, means for stabilizing the output amplitudes of the respective sources at the same level.

11. A system for supplying energy of standard frequency which comprises a selective element characterized by an energy-frequency response curve having a peak at a specified frequency $f_0$ and, on either side of said peak, a sloping portion, two independent tunable oscillators, a frequency multiplier, means including said multiplier for increasing the frequencies of both of said oscillators by the same factor N, means for adjusting the frequency of one of said oscillators as so increased approximately to that of a point on one of said sloping portions, means for adjusting the frequency of the other of said oscillators as so increased approximately to that of a point on the other of said sloping portions, means for applying the energies of said oscillators as so increased individually to said selective element, means for deriving individual output signals from said selective element, means responsive to the difference between the magnitudes of said output signals for tuning both of said oscillators in the same sense to equalize the magnitudes of said output signals, whereby the sum of said two oscillator frequencies is equal to $$\frac{2f_0}{N}$$

means for deriving a source frequency difference signal, and means for returning at least one of said sources to maintain said difference signal at a preassigned value, whereby said sources oscillate respectively at frequencies whose Nth multiples are symmetrically disposed on the upper and lower sloping portions of said response curve.

12. A system for supplying energy of standard frequency which comprises a selective element characterized by an energy-frequency response curve having a peak at a specified frequency $f_0$, a portion of positive slope on one side of said peak and a portion of negative slope on the other side of said peak, two independent tunable oscillation sources of frequencies $f_1$ and $f_2$, a frequency multiplier, means including said sources and said multiplier for furnishing energy at frequencies $f_1'=Nf_1$ and $f_2'=Nf_2$, where N is a preassigned multiplication factor, means for adjusting the frequencies $f_1$ and $f_2$ of said oscillation sources to values such that the multiplied frequency $f_1'$ coincides with that of a point on one of said sloping portions and the multiplied frequency $f_2'$ coincides with that of a point on the other of said sloping portions, means for applying the energies of said frequencies $f_1'$ and $f_2'$ individually and in alternation to said selective element, means for deriving from said selective element two independent output signals one of which is representative of the degree to which said selective element modifies the energy of frequency $f_1'$ while the other is representative of the degree to which said selective element modifies the energy of frequency $f_2'$, means responsive to the difference between the magnitudes of said output signals for tuning both of said oscillation sources in the same sense to equalize said magnitudes, whereby said sources are stabilized at frequencies $f_1$ and $f_2$ such that the multiplied frequencies $f_1'$ and $f_2'$ are equally spaced below and above said peak frequency $f_0$, and the sum frequency $f_1+f_2$ is equal to $$\frac{2f_0}{N}$$

means for stabilizing the oscillator difference frequency $f_1-f_2$ at a value such that the multiplied difference frequency $f_1'-f_2'=N(f_1-f_2)$ is equal to the width of said response curve at its amplitude of greatest slope, means for modulating the outputs of said sources together, thereby to generate energy of which the frequency is the sum of the frequencies $f_1$ and $f_2$, and means for utilizing said sum frequency energy.

References Cited in the file of this patent

UNITED STATES PATENTS

| | | |
|---|---|---|
| 2,245,627 | Varian | June 17, 1941 |
| 2,424,833 | Korman | July 29, 1947 |
| 2,602,897 | Norton | July 8, 1952 |
| 2,632,871 | Erickson | Mar. 24, 1953 |
| 2,683,218 | Norton | July 6, 1954 |

OTHER REFERENCES

Whittaker: abstract of application S. N. 26,802, published July 25, 1950.